United States Patent
Ogasahara

(10) Patent No.: US 12,128,348 B2
(45) Date of Patent: Oct. 29, 2024

(54) DEHUMIDIFICATION SYSTEM

(71) Applicant: ITSWA CO., LTD., Kyoto (JP)

(72) Inventor: Minoru Ogasahara, Kyoto (JP)

(73) Assignee: ITSWA CO., LTD., Kyoto (JP)

( * ) Notice: Subject to any disclaimer, the term of this patent is extended or adjusted under 35 U.S.C. 154(b) by 362 days.

(21) Appl. No.: 17/728,323

(22) Filed: Apr. 25, 2022

(65) Prior Publication Data

US 2022/0241719 A1    Aug. 4, 2022

Related U.S. Application Data

(63) Continuation of application No. PCT/JP2020/039770, filed on Oct. 22, 2020.

(30) Foreign Application Priority Data

Oct. 29, 2019  (JP) .................. 2019-195837

(51) Int. Cl.
   *B01D 53/06* (2006.01)
   *B01D 53/26* (2006.01)
   *F24F 3/14* (2006.01)

(52) U.S. Cl.
   CPC ........... *B01D 53/06* (2013.01); *B01D 53/261* (2013.01); *F24F 3/1411* (2013.01); *B01D 2257/80* (2013.01); *B01D 2259/4009* (2013.01); *B01D 2259/402* (2013.01); *B01D 2259/4508* (2013.01); *F24F 2003/144* (2013.01)

(58) Field of Classification Search
   CPC .. B01D 53/06; B01D 53/261; B01D 2257/80; B01D 2259/4009; B01D 2259/402; B01D 2259/4508; F24F 3/1411; F24F 2003/144; F24F 3/1423; F24F 2003/1458; F24F 2003/1464; F24F 2203/10; F24F 2203/1016; F24F 2203/1032; F24F 2203/1072; F24F 2203/1084; F24F 3/14
   USPC ........................................................ 96/123
   See application file for complete search history.

(56) References Cited

FOREIGN PATENT DOCUMENTS

| EP | 3431890 A1 | 1/2019 | |
|----|----|----|----|
| JP | 2000240979 A * | 9/2000 | ............ F24F 3/1423 |
| JP | 3300565 B | 7/2002 | |
| JP | 6026231 B | 11/2016 | |

* cited by examiner

*Primary Examiner* — Robert A Hopkins
*Assistant Examiner* — Qianping He
(74) *Attorney, Agent, or Firm* — Renner, Otto, Boisselle & Sklar, LLP

(57) ABSTRACT

A dehumidification rotor 1, a desiccant air conditioner 2, a first post-regeneration exhaust pipeline 3 supplying post-regeneration exhaust from a regeneration zone 1b of the dehumidification rotor, a purge air supply pipeline 4 supplying purge air from the desiccant air conditioner to a purge zone of the dehumidification rotor, and a regeneration air supply pipeline 7 supplying regeneration air from the purge zone to the regeneration zone are provided. The desiccant air conditioner comprises a second post-regeneration exhaust pipeline 5 and an outdoor air intake pipeline 6. An indoor air intake pipeline supplying air of a dry room 9 to an absorption zone 1a of the dehumidification rotor 10, a first dry air supply pipeline 11 supplying dry air from the absorption zone to the dry room, and a second dry air supply pipeline 14 supplying dry air from the desiccant air conditioner to the indoor air intake pipeline are provided.

2 Claims, 2 Drawing Sheets

DEHUMIDIFICATION SYSTEM

TECHNICAL FIELD

The present invention relates to a dehumidification system, particularly to a dehumidification system used to maintain a low dew point environment in a dry room.

BACKGROUND ART

A low dew point environment is required for developing and manufacturing lithium-ion batteries and organic EL displays.

A dry room is widely used as a device for generating and maintaining the low dew point environment, and the dry room has a dehumidification system for controlling the dew point in the dry room.

A conventional dehumidification system of this kind comprises a dehumidification rotor. An absorption zone of the dehumidification rotor is connected to the dry room through an indoor air intake pipeline at an input side thereof and an output side of the absorption zone is connected to the dry room through a dry air supply pipe, so that an air circulation line is composed of the dry room, the indoor air intake pipeline, the absorption zone of the dehumidification rotor and the dry air supply pipeline.

Thus moist air in the dry room is taken in the indoor air intake pipeline, and dehumidified while passing through the absorption zone of the dehumidification rotor, and the resulting dry air is supplied from the absorption zone of the dehumidification rotor to the dry room through the dry air supply pipeline, thereby air in the dry room is maintained at the desired low dew point (see, for example, Patent Documents 1 and 2).

In the meantime, under operation of the dry room, the air in the dry room is polluted by worker's exhaled breath and various gases resulting from the processing of substances, and therefore, ventilation in the dry room is appropriately performed to discharge the indoor air to the outside through an exhaust port of the dry room and to take fresh outdoor air in the dry room.

Accordingly, the conventional dehumidification system has an outdoor air intake pipeline for taking the outdoor air in the dry room, and the outdoor air intake pipeline is connected to an indoor air intake pipeline of the dehumidification system, and a cooler is provided in the outdoor air intake pipeline.

Thus the outdoor air is taken in the outdoor air intake pipeline, and dehumidified by condensation at the cooler, thereafter mixed with the indoor air of the dry room flowing in the indoor air intake pipeline, and fed into the absorption zone of the dehumidification rotor so as to be dehumidified by absorption.

However, the outdoor air only dehumidified by condensation has considerably higher dew point temperature than the air in the dry room (contains considerably more moisture than the air in the dry room), and therefore, most of the moisture to be absorbed by the absorption zone of the dehumidification rotor is the moisture contained in the outdoor air.

Thus because it is necessary to decrease the dew point temperature of mixed air of such outdoor air and the air in the dry room at once, a lot of electric power is consumed.

That is to say, the conventional dehumidification system consumes more electric power to dehumidify the outdoor air taken in the dry room (dehumidification system) rather than the air in the dry room, and in this respect, the conventional dehumidification system has the disadvantage of very inefficient use of energy because of wasting a lot of electric power.

PRIOR ART DOCUMENTS

Patent Documents

Patent Document 1: JP 3300565 B1
Patent Document 2: JP 6026231 B1

SUMMARY OF THE INVENTION

Problems to be Solved by the Invention

It is, therefore, an object of the present invention to provide a dehumidification system having a high energy-saving effect.

Means for Solving the Problems

In order to achieve the object, the present invention provides a dehumidification system for maintaining low dew point environment in a dry room, comprising: a dehumidification rotor having at least an absorption zone, a regeneration zone and a purge zone in order along a rotation direction of the dehumidification rotor; an indoor air intake pipeline connected to the dry room at one end thereof and connected to an input side of the absorption zone of the dehumidification rotor at the other end thereof; a first dry air supply pipeline connected to an output side of the absorption zone of the dehumidification rotor at one end thereof and connected to the dry room at the other end thereof; a fan provided in the indoor air intake pipeline; a cooler provided downstream of the fan in the indoor air intake pipeline; a desiccant air conditioner; a first post-regeneration exhaust pipeline supplying post-regeneration exhaust from the regeneration zone of the dehumidification rotor to the desiccant air conditioner; a purge air supply pipeline supplying purge air from the desiccant air conditioner to the purge zone of the dehumidification rotor. The desiccant air conditioner includes a second post-regeneration exhaust pipeline discharging post-regeneration exhaust, and an outdoor air intake pipeline. The dehumidification system further comprises a regeneration air supply pipeline supplying regeneration air discharged from the purge zone of the dehumidification rotor to the regeneration zone of the dehumidification rotor; a heater provided in the regeneration air supply pipeline; and a second dry air supply pipeline supplying dry air from the desiccant air conditioner to an upstream side of the fan in the indoor air intake pipeline.

Here, a term "dry room" means not only a dry room but also any device such as a glove box or a chamber, etc. that can maintain a low dew point environment inside. The same hereinafter.

According to a preferred embodiment of the present invention, the desiccant air conditioner comprises an additional dehumidification rotor having an absorption zone, a regeneration zone and a purge zone in order along a rotation direction of the additional dehumidification rotor. An output end of the first post-regeneration exhaust pipeline is connected to an input side of the absorption zone of the additional dehumidification rotor, and an input end of the purge air supply pipeline is connected to an output side of the absorption zone of the additional dehumidification rotor, and an input end of the second post-regeneration exhaust pipeline is connected to an output side of the regeneration zone of the additional dehumidification rotor. The desiccant air conditioner further comprises an additional fan provided in the first post-regeneration exhaust pipeline, an additional cooler provided downstream of the additional fan in the first post-regeneration exhaust pipeline, and a further additional fan provided in the purge air supply pipeline. The second dry air supply pipeline branches off from an upstream side of the further additional fan in the purge air supply pipeline, and an output end of the outdoor air intake pipeline is connected to an upstream side of the additional fan in the first post-regeneration exhaust pipeline. The desiccant air conditioner further comprises a dumper provided in the second dry air supply pipeline, a further additional cooler provided in the outdoor air intake pipeline, an additional dumper provided downstream of the further additional cooler in the outdoor air intake pipeline, an additional purge air supply pipeline branching off from an upstream side of the further additional fan in the purge air supply pipeline and supplying purge air to the purge zone of the additional dehumidification rotor, an additional regeneration air supply pipeline supplying regeneration air discharged from the purge zone of the additional dehumidification rotor to the regeneration zone of the additional dehumidification rotor, and an additional heater provided in the additional regeneration air supply pipeline. An input end of the second post-regeneration exhaust pipeline is connected to an output side of the regeneration zone of the additional dehumidification rotor.

Effect Of The Invention

According to the present invention, the dehumidification system comprises the dehumidification rotor and the desiccant air conditioner, and airflow in the dehumidification system is essentially separated into an airflow circulating in a first closed loop pipeline which passes through the absorption zone of the dehumidification rotor and the dry room, and an airflow circulating in a second closed loop pipeline which passes through the regeneration zone of the dehumidification rotor, the purge zone of the dehumidification rotor and the desiccant air conditioner. Also, the desiccant air conditioner comprises the post-regeneration exhaust pipeline and the outdoor air intake pipeline. Further, the pipeline is provided for supplying dry air from the desiccant air conditioner to a position between the dry room and the absorption zone of the dehumidification rotor in the first closed loop pipeline.

Then when the dry room is not ventilated (during normal operation of the dry room), air circulates independently in each of the first and the second closed loop pipelines. Therefore, the amount of moisture to be absorbed by the absorption zone of the dehumidification rotor is small because the absorption zone processes only the airflow circulating in the first closed loop pipeline. On the other hand, in the second closed loop pipeline, the amount of the moisture to be absorbed by the desiccant air conditioner is also small because the desiccant air conditioner only has to process the moisture in the first closed loop pipeline which is absorbed by the dehumidification rotor.

Consequently, the dehumidification rotor and the desiccant air conditioner consume less electric power.

When the dry room is ventilated to take fresh air in the dry room, exhaust is done from the dry room to the outside and the required amount of outdoor air is taken in the second closed loop pipeline of the dehumidification system through the outside air intake pipeline. The outdoor air taken in the second closed loop pipeline is dehumidified by the desiccant air conditioner and supplied as dry air from the desiccant air conditioner to the first closed loop pipeline.

Then the mixed air of this dry air and the air in the dry room is dehumidified to a predetermined low dew point in the absorption zone of the dehumidification rotor and supplied to the dry room.

Also, in this case, the first and the second closed loop pipelines are essentially separated from each other, and the outdoor air is firstly fed into the second closed loop pipeline, dehumidified by the desiccant air conditioner, and then supplied to the first closed loop pipeline.

The dew point temperature of dry air supplied from the desiccant air conditioner is much lower than the dew point temperature of the outdoor air dehumidified by condensation in the cooler. Therefore, the amount of the moisture to be absorbed in the absorption zone of the dehumidification rotor is much smaller than the amount of the moisture to be absorbed in the absorption zone of the dehumidification rotor of the conventional dehumidification system. The amount of the moisture to be absorbed by the desiccant air conditioner is also small.

Consequently, the dehumidification rotor and the desiccant air conditioner consume less electric power.

Thus, according to the present invention, the power consumption of the dehumidification system is significantly reduced so that the energy utilization efficiency of the system is extremely improved.

BEST MODE FOR CARRYING OUT THE INVENTION

A preferred embodiment of the present invention will be explained below with reference to accompanying drawings.

Figure 1A:
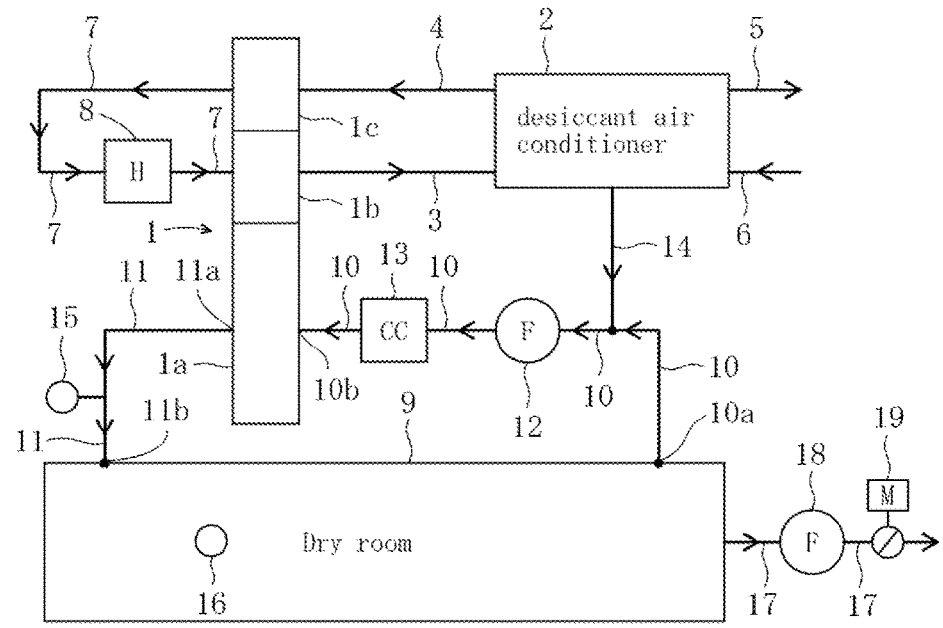
FIG. 1(A) is a diagram showing a schematic configuration of a dehumidification system according to an embodiment of the present invention.
Figure 1B:
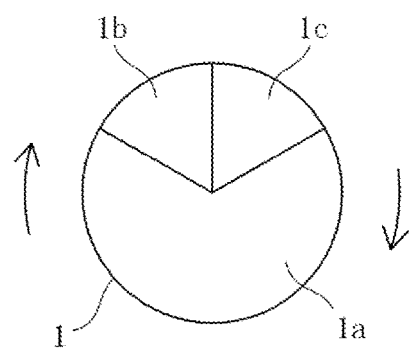
FIG. 1(B) is a schematic cross-sectional view of a dehumidification rotor of the dehumidification system shown in FIG. 1(A).

FIG. 1(A) is a diagram showing a schematic configuration of a dehumidification system according to an embodiment of the present invention, and FIG. 1(B) is a schematic cross-sectional view of a dehumidification rotor of the dehumidification system shown in FIG. 1(A).

As shown in FIG. 1, according to the present invention, a first dehumidification rotor 1 having at least an absorption zone 1a, a regeneration zone 1b and a purge zone 1c in order along a rotation direction of the first dehumidification rotor 1, a desiccant air conditioner 2, and a first post-regeneration exhaust pipeline 3 supplying post-regeneration exhaust from the regeneration zone 1b of the first dehumidification rotor 1 to the desiccant air conditioner 2 are provided. Further, a first purge air supply pipeline 4 supplying purge air from the desiccant air conditioner 2 to the purge zone 1c of the first dehumidification rotor 1, and a first regeneration air supply pipeline 7 supplying regeneration air discharged from the purge zone 1c of the first dehumidification rotor 1 to the regeneration zone 1b of the first dehumidification rotor 1 are provided.

The desiccant air conditioner 2 includes a second post-regeneration exhaust pipeline 5 discharging post-regeneration exhaust, and an outdoor air intake pipeline 6.

A first heater 8 is provided in the first regeneration air supply pipeline 7, and an indoor air intake pipeline 10 is connected to the dry room 9 at one end thereof 10a and connected to an input side of the absorption zone 1a of the first dehumidification rotor 1 at the other end thereof 10b.

Further, a first dry air supply pipeline 11 is connected to an output side of the absorption zone 1a of the first dehumidification rotor 1 at one end thereof 11a and connected to the dry room 9 at the other end thereof 11b.

A first fan 12 is provided in the indoor air intake pipeline 10, and a first cooler (cooling coil) 13 is provided downstream of the first fan 12 in the indoor air intake pipeline 10.

Also, according to the present invention, a second dry air supply pipeline 14 supplying dry air from the desiccant air conditioner 2 to an upstream side of the first fan 12 in the indoor air intake pipeline 10, a dew point meter 15 provided in the first dry air supply pipeline 11, and a dew point meter 16 arranged in the dry room 9.

Figure 2A:
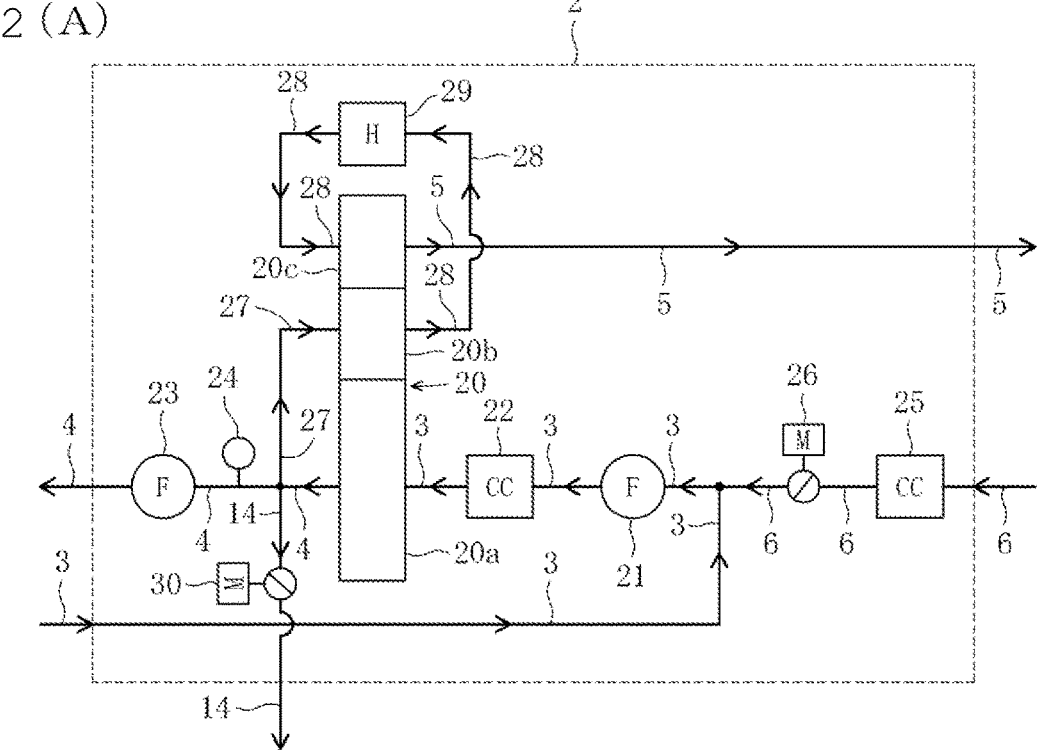
FIG. 2(A) is a diagram showing a schematic configuration of an example of a desiccant air conditioner of the dehumidification system shown in FIG. 1.
Figure 2B:
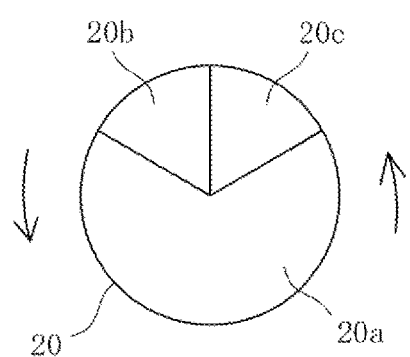
FIG. 2(B) is a schematic cross-sectional view of a dehumidification rotor of the desiccant air conditioner shown in FIG. 2(A).

FIG. 2(A) is a diagram showing a schematic configuration of an example of a desiccant air conditioner of the dehumidification system shown in FIG. 1, and FIG. 2(B) is a schematic cross-sectional view of a dehumidification rotor of the desiccant air conditioner shown in FIG. 2(A).

As shown in FIG. 2(B), the desiccant air conditioner 2 comprises a second dehumidification rotor 20 having an absorption zone 20a, a regeneration zone 20c and a purge zone 20b in order along a rotation direction of the second dehumidification rotor 20.

As shown in FIG. 2(A), an output end of the first post-regeneration exhaust pipeline 3 is connected to an input side of the absorption zone 20a of the second dehumidification rotor 20, and an input end of the first purge air supply pipeline 4 is connected to an output side of the absorption zone 20a of the second dehumidification rotor 20, and an input end of the second post-regeneration exhaust pipeline 5 is connected to an output side of the regeneration zone 20c of the second dehumidification rotor 20.

The desiccant air conditioner 2 also comprises a second fan 21 provided in the first post-regeneration exhaust pipeline 3, a second cooler (cooling coil) 22 provided downstream of the second fan 21 in the first post-regeneration exhaust pipeline 3, and a third fan 23 provided in the first purge air supply pipeline 4.

The second dry air supply pipeline 14 branches off from an upstream side of the third fan 23 in the first purge air supply pipeline 4, and an output end of the outdoor air intake pipeline 6 is connected to an upstream side of the second fan 21 in the first post-regeneration exhaust pipeline 3.

A motor dumper 30 is provided in the second dry air supply pipeline 14, and a dew point meter 24 is located at an appropriate position of the first purge air supply pipeline 4.

The desiccant air conditioner 2 further comprises a third cooler 25 provided in the outdoor air intake pipeline 6, a motor dumper 26 provided downstream of the third cooler 25 in the outdoor air intake pipeline 6, a second purge air supply pipeline 27 branching off from an upstream side of the third fan 23 in the first purge air supply pipeline 4 and supplying purge air to the purge zone 20b of the second dehumidification rotor 20, a second regeneration air supply pipeline 28 supplying regeneration air discharged from the purge zone 20b of the second dehumidification rotor 20 to the regeneration zone 20c of the second dehumidification rotor 20, and a second heater 29 provided in the second regeneration air supply pipeline 28.

An input end of the second post-regeneration exhaust pipeline 26 is connected to an output side of the regeneration zone 20c of the second dehumidification rotor 20.

Referring to FIG. 1(A) again, the dry room 9 is provided with an exhaust pipeline 17. A fourth fan 18 is provided in the exhaust pipeline 17, and a motor dumper 19 is provided upstream of the fourth fan 18 in the exhaust pipeline 17.

When the dry room 9 is not ventilated during operation of the dry room 9, the motor dumper 19 of the exhaust pipeline 17 is closed and the fourth fan 18 is stopped.

Then airflow in the dehumidification system is essentially separated into an airflow circulating in a first closed loop pipeline (composed form the indoor air intake pipeline 10 and the first dry air supply pipeline 11) which passes through the absorption zone 1a of the first dehumidification rotor 1 and the dry room 9, and an airflow circulating in a second closed loop pipeline (composed of the first post-regeneration exhaust pipeline 3, the first purge air supply pipeline 4 and the first regeneration air supply pipeline 7) which passes through the regeneration zone 1b of the first dehumidification rotor 1, the purge zone 1c of the first dehumidification rotor 1 and the desiccant air conditioner 2.

During the air circulation in the first closed loop pipeline, air in the dry room 9 is taken in the first cooler 13 through the indoor air intake pipeline 10, dehumidified by condensation in the first cooler 13, and supplied to the absorption zone 1a of the first dehumidification rotor 1.

In the absorption zone 1a, the rotor absorbs the moisture of the supplied air, and dry air dehumidified by the rotor is supplied to the dry room 9 through the first dry air supply pipeline 11.

On the other hand, during the air circulation in the second closed loop pipeline, air heated by the first heater 8 is fed into the regeneration zone 1b of the first dehumidification rotor 1 so as to absorb the moisture contained in the rotor. In the meantime, the rotor is regenerated (dehumidified) by the heated air and moves from the regeneration zone 1b to the purge zone 1c.

The moist air used to regenerate the rotor is discharged from the regeneration zone 1b, fed into the second cooler 22 of the desiccant air conditioner 2, and dehumidified by condensation in the second cooler 22. The air discharged from the second cooler 22 is supplied to the absorption zone 20a of the second dehumidification rotor 20 of the desiccant air conditioner 2.

In the absorption zone 20a, the rotor absorbs the moisture of the supplied air, and the resulting dry air is supplied from the absorption zone 20a to the purge zone 1c of the first dehumidification rotor 1 through the first purge air supply pipeline 4.

The rotor which has absorbed moisture moves the absorption zone 20a to the regeneration zone 20c.

In the regeneration zone 20c, the rotor is regenerated (dehumidified) by the air supplied by the second regeneration air supply pipeline 28 and moves from the regeneration zone 20c to the purge zone 20b, while the moist air used to regenerate the rotor is discharged to the outside through the second post-regeneration exhaust pipeline 5.

Then the opening of the motor dumper 26 is adjusted so that the outdoor air is taken in the first post-regeneration exhaust pipeline 3 (the first closed loop pipeline) through the outdoor air intake pipeline 6 by the amount corresponding to the amount of air discharged to the outside from the regeneration zone 20c of the second dehumidification rotor 20.

The outdoor air is dehumidified by condensation in the third cooler 25 while flowing through the outdoor air intake pipeline 6.

In the purge zone 1c, the rotor is cooled by the air supplied by the first purge air supply pipeline 4 while the supplied air is heated by the rotor. The rotor cooled by the purge zone 1c moves to the absorption zone 1a.

A part of the dry air flowing through the first purge air supply pipeline 4 is supplied to the purge zone 20b of the second dehumidification rotor 20 through the second purge air supply pipeline 27. In the purge zone 20b, the rotor is cooled by the supplied air while the supplied air is heated by the rotor. The rotor cooled in the purge zone 20b moves to the absorption zone 20a.

The air discharged from the purge zone 20b is supplied to the regeneration zone 20c through the second regeneration air supply pipeline 28. The air is heated by the second heater 29 while flowing through the second regeneration air supply pipeline 28.

Under operation of the dry room 9, when the air in the dry room 9 is polluted by worker's exhaled breath and various gases resulting from the processing of substances, ventilation in the dry room 9 is done.

When the ventilation is done, the motor dumper 19 is opened and the fourth fan 18 is activated so that the air in the dry room 9 is discharged to the outside through the exhaust pipeline 17.

At the same time, the motor dumper 30 is opened at the predetermined opening so that the outdoor air is taken in the outdoor air intake pipeline 6 of the desiccant air conditioner 2 by the amount corresponding to the amount of exhaust discharged from the dry room 9 through the exhaust pipeline 17. The air taken in the outdoor air intake pipeline 6 is dehumidified by the desiccant air conditioner 2, and supplied as dry air from the desiccant air conditioner 2 to the indoor air intake pipeline 10 (the second closed loop pipeline) through the second dry air supply pipeline 14.

Next, mixed air of this dry air and the air in the dry room 9 is dehumidified to a predetermined dew point in the absorption zone 1a of the first dehumidification rotor 1, and supplied to the dry room 9, thereby a fresh air is supplied to the dry room 9 while keeping the air in the dry room 9 at a low dew point.

According to the present invention, the dehumidification system comprises the first dehumidification rotor 1 and the desiccant air conditioner 2, and airflow in the dehumidification system is essentially separated into an airflow circulating in a first closed loop pipeline which passes through the absorption zone 1a of the first dehumidification rotor 1 and the dry room 9, and an airflow circulating in a second closed loop pipeline which passes through the regeneration zone 1b of the first dehumidification rotor 1, the purge zone 1c of the first dehumidification rotor 1 and the desiccant air conditioner 2.

Also, the desiccant air conditioner 2 comprises the post-regeneration exhaust pipeline 5 and the outdoor air intake pipeline 6. Further, the pipeline 16 is provided for supplying dry air from the desiccant air conditioner 2 to a position between the dry room 9 and the absorption zone 1a of the first dehumidification rotor 1 in the first closed loop pipeline.

Then when the dry room 9 is not ventilated (during normal operation of the dry room), air circulates independently in each of the first and the second closed loop pipelines. Therefore, the amount of moisture to be absorbed by the absorption zone 1a of the first dehumidification rotor 1 is small because the absorption zone 1a processes only the airflow circulating in the first closed loop pipeline. On the other hand, in the second closed loop pipeline, the amount of the moisture to be absorbed by the desiccant air conditioner 2 is also small because the desiccant air conditioner 2 only has to process the moisture in the first closed loop pipeline which is absorbed by the first dehumidification rotor 1.

Consequently, the first dehumidification rotor 1 and the desiccant air conditioner 2 consume less electric power.

When the dry room 9 is ventilated to take fresh air in the dry room 9, exhaust is done from the dry room 9 to the outside and the required amount of outdoor air is taken in the second closed loop pipeline of the dehumidification system through the outside air intake pipeline 6. The outdoor air taken in the second closed loop pipeline is dehumidified by the desiccant air conditioner 2 and supplied as dry air from the desiccant air conditioner 2 to the first closed loop pipeline.

Also in this case, the first and the second closed loop pipelines are essentially separated from each other, and the outdoor air is firstly fed into the second closed loop pipeline, dehumidified by the desiccant air conditioner 2, and then supplied to the first closed loop pipeline.

The dew point temperature of dry air supplied from the desiccant air conditioner 2 is much lower than the dew point temperature of the outdoor air dehumidified by condensation in the cooler. Therefore, the amount of the moisture to be absorbed in the absorption zone 1a of the first dehumidification rotor 1 is much smaller than the amount of the moisture to be absorbed in the absorption zone of the dehumidification rotor of the conventional dehumidification system. The amount of the moisture to be absorbed by the desiccant air conditioner 2 is also small.

Consequently, the first dehumidification rotor 1 and the desiccant air conditioner 2 consume less electric power.

Thus, according to the present invention, the power consumption of the dehumidification system is significantly reduced so that the energy utilization efficiency of the system is extremely improved.

Although the present invention has been explained based on preferred embodiments thereof, the present invention is not limited to the embodiment and one skilled in the art can easily devise various modified embodiments within the scope of the claims of the present application.

For example, the configuration of the desiccant air conditioner of the above-mentioned embodiment is only an example, and any known desiccant air conditioner with any configuration can be used in the present invention.

DESCRIPTION OF REFERENCE NUMERALS

1 First dehumidification rotor
1a Absorption zone
1b Regeneration zone
1c Purge zone
2 Desiccant air conditioner
3 First post-regeneration exhaust pipeline
4 First purge air supply pipeline
5 Second post-regeneration exhaust pipeline
6 Outdoor air intake pipeline
7 First regeneration air supply pipeline
8 First heater
9 Dry room
10 Indoor air intake pipeline
10a One end
10b The other end
11 First dry air supply pipeline
11a One end
11b The other end
12 First fan
13 First cooler 14 Second dry air supply pipeline
15 Dew point meter
16 Dew point meter
17 Exhaust pipeline
18 Fourth fan
19 Motor dumper
20 Second dehumidification rotor
20a Absorption zone
20b Purge zone
20c Regeneration zone
21 Second fan
22 Second cooler
23 Third fan
24 Dew point meter
25 Third cooler
26 Motor dumper
27 Second purge air supply pipeline
28 Second regeneration air supply pipeline
29 Second heater
30 Motor dumper

The invention claimed is:

1. A dehumidification system for maintaining low dew point environment in a dry room, comprising:
a dehumidification rotor having at least an absorption zone, a regeneration zone and a purge zone in order along a rotation direction of the dehumidification rotor;
an indoor air intake pipeline connected to the dry room at one end thereof and connected to an input side of the absorption zone of the dehumidification rotor at the other end thereof;
a first dry air supply pipeline connected to an output side of the absorption zone of the dehumidification rotor at one end thereof and connected to the dry room at the other end thereof;
a fan provided in the indoor air intake pipeline;
a cooler provided downstream of the fan in the indoor air intake pipeline;
a desiccant air conditioner;
a first post-regeneration exhaust pipeline supplying post-regeneration exhaust from the regeneration zone of the dehumidification rotor to the desiccant air conditioner;
a purge air supply pipeline supplying purge air from the desiccant air conditioner to the purge zone of the dehumidification rotor,
the desiccant air conditioner including a second post-regeneration exhaust pipeline discharging post-regeneration exhaust, and an outdoor air intake pipeline;
a regeneration air supply pipeline supplying regeneration air discharged from the purge zone of the dehumidification rotor to the regeneration zone of the dehumidification rotor;
a heater provided in the regeneration air supply pipeline; and
a second dry air supply pipeline supplying dry air from the desiccant air conditioner to an upstream side of the fan in the indoor air intake pipeline,
wherein the desiccant air conditioner comprises
an additional dehumidification rotor having an absorption zone, a regeneration zone and a purge zone in order along a rotation direction of the additional dehumidification rotor,
wherein an output end of the first post-regeneration exhaust pipeline is connected to an input side of the absorption zone of the additional dehumidification rotor, and an input end of the purge air supply pipeline is connected to an output side of the absorption zone of the additional dehumidification rotor, the second dry air supply pipeline branches off from the purge air supply pipeline and an input end of the second post-regeneration exhaust pipeline is connected to an output side of the regeneration zone of the additional dehumidification rotor.

2. The dehumidification system according to claim 1, wherein the desiccant air conditioner further comprises
an additional fan provided in the first post-regeneration exhaust pipeline,
an additional cooler provided downstream of the additional fan in the first post-regeneration exhaust pipeline, and
a further additional fan provided in the purge air supply pipeline,
wherein the second dry air supply pipeline branches off from an upstream side of the further additional fan in the purge air supply pipeline, and an output end of the outdoor air intake pipeline is connected to an upstream side of the additional fan in the first post-regeneration exhaust pipeline,
wherein the desiccant air conditioner further comprises
a dumper provided in the second dry air supply pipeline,
a further additional cooler provided in the outdoor air intake pipeline,
an additional dumper provided downstream of the further additional cooler in the outdoor air intake pipeline,
an additional purge air supply pipeline branching off from an upstream side of the further additional fan in the purge air supply pipeline and supplying purge air to the purge zone of the additional dehumidification rotor,
an additional regeneration air supply pipeline supplying regeneration air discharged from the purge zone of the additional dehumidification rotor to the regeneration zone of the additional dehumidification rotor, and
an additional heater provided in the additional regeneration air supply pipeline,
an input end of the second post-regeneration exhaust pipeline being connected to an output side of the regeneration zone of the additional dehumidification rotor.

* * * * *